US008055728B2

(12) United States Patent
Burton et al.

(10) Patent No.: US 8,055,728 B2
(45) Date of Patent: Nov. 8, 2011

(54) REMOTE CONTROL OF SELECTED TARGET CLIENT COMPUTERS IN ENTERPRISE COMPUTER NETWORKS THROUGH GLOBAL MASTER HUBS

(75) Inventors: Toby Burton, Austin, TX (US); Rhonda L. Childress, Austin, TX (US); Andrea Denise Franklin, Austin, TX (US); Christopher Walter Kempin, Fuquay-Varina, NC (US); Jennifer Saiman Lo, Austin, TX (US); Oluyemi Babatunde Saka, Austin, TX (US); Jonathan Samn, Austin, TX (US); Cindy Marie Uanino, Crofton, MD (US)

(73) Assignee: International Business Machines Corporation, Armonk, NY (US)

( * ) Notice: Subject to any disclaimer, the term of this patent is extended or adjusted under 35 U.S.C. 154(b) by 3782 days.

(21) Appl. No.: 10/132,403

(22) Filed: Apr. 25, 2002

(65) Prior Publication Data
US 2003/0204855 A1 Oct. 30, 2003

(51) Int. Cl.
G06F 15/16 (2006.01)
(52) U.S. Cl. ........ 709/219; 709/220; 709/221; 709/222; 709/223; 709/224; 709/225; 709/226
(58) Field of Classification Search .......... 709/220–226; 725/119
See application file for complete search history.

(56) References Cited

U.S. PATENT DOCUMENTS

| 5,509,123 | A | * | 4/1996 | Dobbins et al. | 709/243 |
|---|---|---|---|---|---|
| 5,701,451 | A | | 12/1997 | Rogers et al. | 395/600 |
| 5,956,521 | A | * | 9/1999 | Wang | 710/35 |
| 6,209,029 | B1 | | 3/2001 | Epstein et al. | 709/219 |
| 6,230,324 | B1 | | 5/2001 | Tomita et al. | 725/51 |
| 6,240,415 | B1 | * | 5/2001 | Blumberg | 707/9 |
| 6,311,321 | B1 | * | 10/2001 | Agnihotri et al. | 717/120 |
| 6,658,468 | B1 | * | 12/2003 | Charton | 709/224 |
| 6,694,412 | B2 | * | 2/2004 | Frank et al. | 711/153 |
| 6,718,481 | B1 | * | 4/2004 | Fair | 714/4 |
| 7,003,560 | B1 | * | 2/2006 | Mullen et al. | 709/223 |
| 7,130,261 | B1 | * | 10/2006 | Skrzynski et al. | 370/216 |
| 7,197,546 | B1 | * | 3/2007 | Bagga et al. | 709/223 |

(Continued)

Primary Examiner — Thu Nguyen
Assistant Examiner — Tauqir Hussain
(74) Attorney, Agent, or Firm — Julius B. Kraft; Mark C. Vallone

(57) ABSTRACT

An enterprise computer network comprising a hierarchy of client computers interconnected through a plurality of server computers at a plurality of hierarchical levels. A system, method and object oriented computer program for giving a selected controller computer remote control of a selected target client computer in the network comprising the combination of a plurality of server controlled regional hubs, each hub connected to and serving a network region including a set of target client computers; and a function for storing at each server controlled regional hub, a remote control object including data necessary to access and remotely control each of the target client computers served by said hub. This is essentially a standard regional set up for remote control by a remote controller. Into this environment, there is combined a global master hub connected to the plurality of regional hubs, the global master hub being normally functionally independent of the regional hubs and the sets of target computers served by said hubs. The remote controller computers are selectively connected to this global master hub, and there are means in each remote controller for requesting control of a selected target computer via said global master hub combined with means responsive to said requesting means to transmit the remote control object of the regional hub serving the selected target computer to said global hub whereby the global hub acts like a proxy of said regional hub in establishing control by said remote controller of said selected target computer.

24 Claims, 4 Drawing Sheets

U.S. PATENT DOCUMENTS

2003/0028883 A1* 2/2003 Billmaier et al. ............... 725/46
2003/0051020 A1* 3/2003 Kadam et al. ................. 709/223
2003/0065731 A1* 4/2003 Mohammed et al. ......... 709/208

* cited by examiner

REMOTE CONTROL OF SELECTED TARGET CLIENT COMPUTERS IN ENTERPRISE COMPUTER NETWORKS THROUGH GLOBAL MASTER HUBS

TECHNICAL FIELD

The present invention relates to computer networks using object oriented programming systems for remote control of client computers experiencing or contributing to error conditions in order that the error conditions may be diagnosed and corrected.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. Two of these technologies are the network related distribution of computer related work functions and object oriented programming systems. The computer and communications industries have extensively participated in the development and continual upgrading of object oriented programming systems, such as the C++ and Java systems. For details and background with respect to object oriented programming systems, such as the Java programming system, C++ and others, reference may be made to some typical texts: *Just Java,* 2nd Edition, Peter van der Linden, Sun Microsystems, 1997; *Thinking in Java,* Bruce Eckel, Prentice Hall PTR, 1998; and *Objects, Components and Frameworks with UML*, Desmond F. D'Sousa et al., Addison-Wesley, 1998.

The convergence of the electronic entertainment and consumer industries with data processing has greatly accelerated the demand for wide ranging communications distribution channels through computer communication networks.

With the expanded accessibility of hundreds of thousands of programmers, information distributors and users to each other, not to mention to potential users of such programs via the expanded network client bases, an obvious need became apparent: cooperative program systems in a distributed and shared programming environment. Object oriented programming offered the solution. With its potentially interchangeable objects or units within which both data attributes and functions were stored in a predefined uniform framework, as well as the predefined object interfaces with each other, object oriented programming systems have found acceptance as the programming system for the Internet and networks in general.

As a result of this changed global environment with widespread distribution of functions over hundreds and even thousands of miles, the diagnosis and correction of error conditions at particular terminals, i.e. target client computers, is becoming more complex. On complex and widespread networks, the users at client terminals in error conditions or needing help requiring diagnostics do not often have the convenience of direct hands-on help or service. Consequently, remote diagnostics and correction has become a necessity. One typical remote control diagnostic and correction function for network client terminal problems is available from Tivoli Systems: the Tivoli Remote Control function. Such a function enables "Help Desk" and like support personnel to observe activity on a target user's computer, as well as take control of the target computer directly to correct a problem or perform a task that the requesting user is having difficulty with. These functions allow the support personnel to pinpoint the source of the user's problem so that they may be able to provide proper instructions to the user. By taking control of the computer directly, the support personnel may quickly resolve problems without having to go to the user's facility. The present invention relates to remote control systems, such as the Tivoli system, that establish regions each managed through a plurality of regional hub servers. A regional hub server manages a hierarchy usually of several levels including spokes with sub-hubs or nodes in a tree that eventually ends in up to hundreds of client computers that are the potential target computers for the remote controller computers controlling the diagnostics and error corrections. With the expansion of network function distribution over extensive enterprise order proportions, the existing processes in which the remote controller computer is requested to do the diagnostics must proceed directly through each regional hub in order to reach target problem client computers is becoming less efficient and manageable. In the diagnostics and solution of problem conditions, the remote controller computer may have to take control of, or at least look at, several target client computers. Existing procedures wherein the remote controller in seeking its target computers must proceed through a sequence of regional hub servers is becoming too slow and less efficient.

SUMMARY OF THE PRESENT INVENTION

The present invention provides for a network system that enables the operating remote controller computer to more quickly and effectively take over and maintain control of its selected target client computers for diagnostics and problem correction.

The invention is directed to an enterprise computer network comprising a hierarchy of client computers interconnected through a plurality of server computers at a plurality of hierarchical levels. The invention provides a system, method and object oriented computer program for giving a selected controller computer remote control of a selected target client computer in the network comprising the combination of a plurality of server controlled regional hubs, each hub connected to and serving a network region including a set of target client computers; and means for storing at each server controlled regional hub, a remote control object including data necessary to access and remotely control each of the target client computers served by said hub. This is essentially a standard regional set up for remote control by a remote controller. Into this environment, there is combined a global master hub connected to the plurality of regional hubs, the global master hub being normally functionally independent of the regional hubs and the sets of target computers served by such hubs. The remote controller computers are connected to this global master hub, and there are means in each remote controller for requesting control of a selected target computer via said global master hub combined with means responsive to said requesting means to transmit the remote control object from the regional hub serving the selected target computer to said global hub whereby the global hub may then act like a proxy of said regional hub in establishing control by said remote controller of the selected target computer. Object oriented programming is used in which there is an object oriented program framework between said global master hub and said regional hubs providing a common interface enabling the exchange of objects between global master and regional hubs. For best results, the object oriented program framework uses object request broker protocols and, particularly, one with a Common Object Request Broker Architecture (CORBA).

The remote controller computer may be associated with a help desktop in the enterprise computer network. The remote controller computer performs diagnostics on the selected target computer. It may also transmit, via said global master hub to said selected target computer, data objects for correcting error conditions diagnosed on the target computer.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
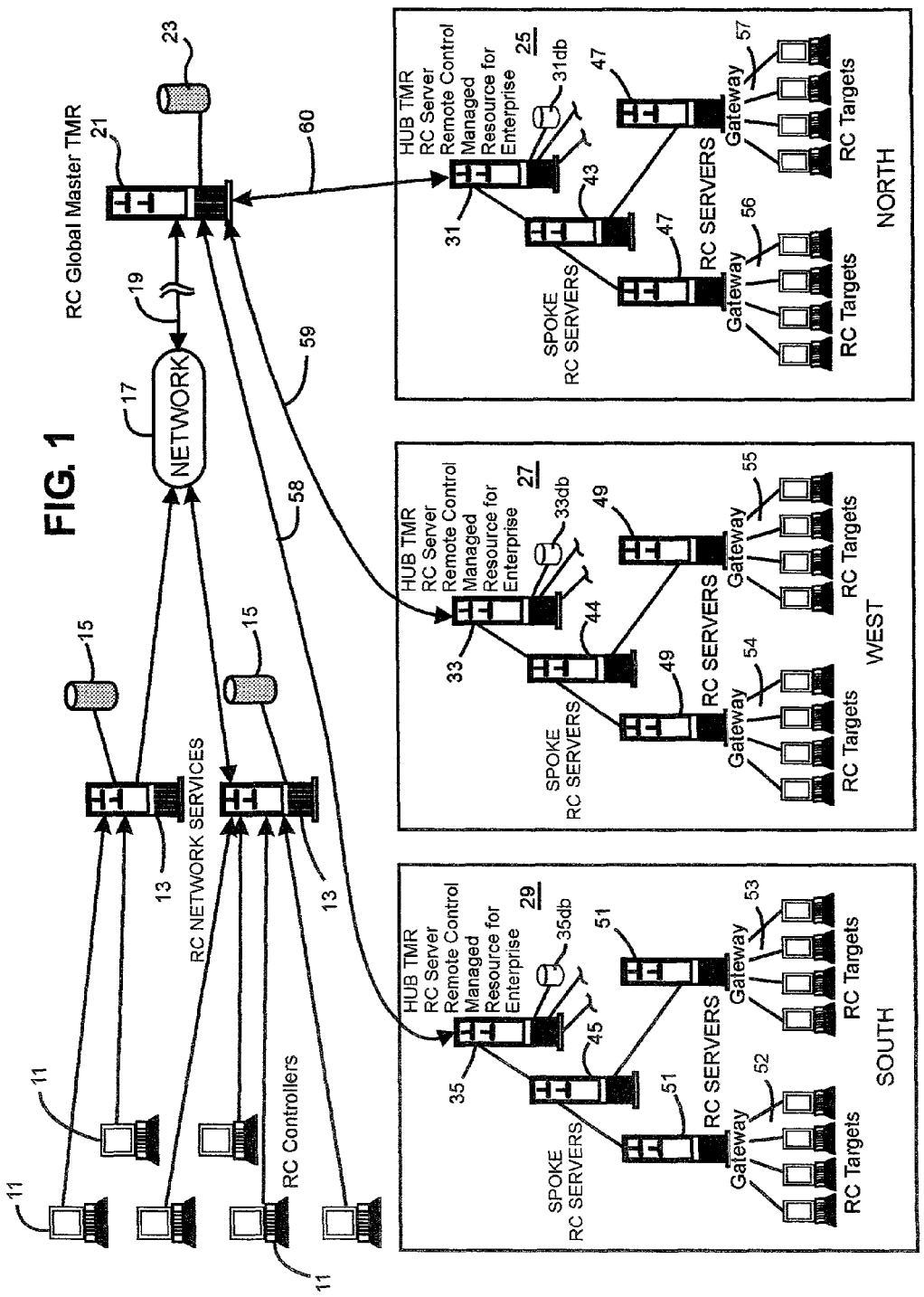
FIG. 1 is a block diagram of a generalized remote control network on which the present invention may be implemented.

Before going into the details of specific embodiments, it will be helpful to understand from a more general background perspective of the various object oriented program implements that may be used in the present invention. The present invention may be conveniently implemented using the C++ Programming system that is an object-oriented system utilizing the C programming language, as referenced above. The Java system and language that are extensively familiar to those skilled in the art may also be used. The text, "Just Java", Peter van der Linden, described above, comprehensively details the system and language. Nonetheless, it may be helpful to generally review the known principles of object-oriented programming.

It should be understood by those skilled in the art that object oriented programming techniques involve the definition, creation, use and instruction of "objects". These objects are software entities comprising data elements or attributes and methods that manipulate the data elements. Objects may also include data related to events outside of the object to trigger or control methods within the object. The data and related methods are treated by the software as an entity and can be created, used and deleted as such. The data and functions enable objects to model their real world equivalent entity in terms of its attributes, which can be presented by the data elements, and its behavior that can be represented by its methods.

Objects are defined by creating "classes" that are not objects themselves, but act as templates that instruct a compiler how to construct the actual object. For example, a class may specify the number and type of data variables and the steps involved in the functions that manipulate the data. An object is actually created in the program by means of a special function called a constructor that uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide or encapsulate all, or a portion, of the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods that access the object's private data. The public methods form an interface between the private data and external programs. An attempt to write program code that directly accesses the private variables causes a compiler to generate an error during program compilation. This error stops the compilation process and prevents the program from being run.

Polymorphism allows objects and functions which have the same overall format, but work with different data, to function differently to produce consistent results. For example, an object may have format or attribute data and methods to support a geometric shape. The same format can be used whether the shape is a rectangle or a circle. However, the actual program code that performs the shape formation may differ widely depending on the type of variables that comprise the shape. After the methods have been defined, a program can later refer to the shape formation method by its common format and, during compilation, the compiler will determine which of the shaping methods to be used by examining the variable types. The compiler will then substitute the proper function code.

A third property of object oriented programming is inheritance that allows program developers to reuse preexisting programs. Inheritance allows a software developer to define classes and the objects that are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines that are all directed to performing commonly encountered tasks in a particular environment. Such predefined classes are typically called "frameworks" and essentially provide a prefabricated structure as a basis for creating a working application program.

In object oriented programming, such as the previously described C++ system, there is provided for the developer a framework containing a set of predefined interface objects. Frameworks are predefined structures for objects, combinations of objects that form more extensive objects and eventually combinations that provide whole programs. The framework contains predefined classes that can be used as base classes and a developer may accept and incorporate some of the objects into these base classes, or he may modify or override objects or combinations of objects in these base classes to extend the framework and create customized solutions in particular areas of expertise.

Referring to FIG. 1, there is provided a generalized view of a remote control network in accordance with the present invention. The remote controllers 11 are respectively associated with RC Network servers 13 with access to their respective databases 15. The servers 13 are network servers that connect the remote controllers 11 via a network 17, which may be the Internet, among others, to the remote control global master hub 21 with its associated database 23 via connection 19. This global master hub 21 is normally functionally independent of the regional HUB TMRs 31, 33 and 35 that are servers respectively serving the North 25, West 27 and South 29 network regions. In the North Region 25, the regional hub server 31 is connected though a hierarchy of spoke servers 43, and gateway servers 47 to group 56 and group 57 of the remote control target computers or terminals. Likewise, in the West Region 27, the regional hub server 33 is connected though a hierarchy of spoke servers 44, and gateway servers 49 to group 54 and group 55 of the remote control target computers or terminals; and in the South Region 29, the regional hub server 35 is connected through a hierarchy of spoke servers 45, and gateway servers 51 to group 52 and group 53 of the remote control target computers or terminals.

The global master hub 21 is normally functionally independent of regional hubs 31, 33 and 35. However, two-way connections 58, 59 and 60 are in place between the global master 21 and regional hubs 35, 33 and 31, respectively. The remote control objects, i.e. the objects that will activate and set up the protocols for any remote control session between a remote controller 11 and any of the RC targets in groups 52 through 57, are stored in association with the respective regional hub servers for the regions in which the selected RC target computers are located. These remote control objects are respectively stored in databases 35*db*, 33*db* and 31*db*, each of which is connected to and supports one of said regional hubs. The key to the present invention, which will subsequently be described in greater detail with respect to FIGS. 3 and 4, involves transmitting the appropriate remote control object from the regional hub server for the region in which the selected target computer is located to the global master hub 21 over the appropriate connection 58 to 60 in response to a request from a remote control controller 11 whereby the global master hub 21 acts like a proxy of the regional hub 31, 33 or 35 in the establishment of remote control by the remote controller. It should also be noted that in addition to the remote control object, there is also stored respectively at each of the regional databases 31*db*, 33*db* and 35*db*, additional local data identifying and supporting the regional hub and the regional target computer operations. Unlike the control data within the remote control object's framework, this local data is outside the remote control object's framework; it is not object oriented data and is stored in a relational database format. Nonetheless, it may further support the operation of the global master hub as a proxy for the regional hub. Consequently, it is desirable that this local data also be available. In such a case, the local non-object data may conveniently be transmitted when the remote control object is transmitted from the regional to the global hub. The transmitted local data is stored in relational database form on database 23 associated with the global hub 21.

Figure 2:
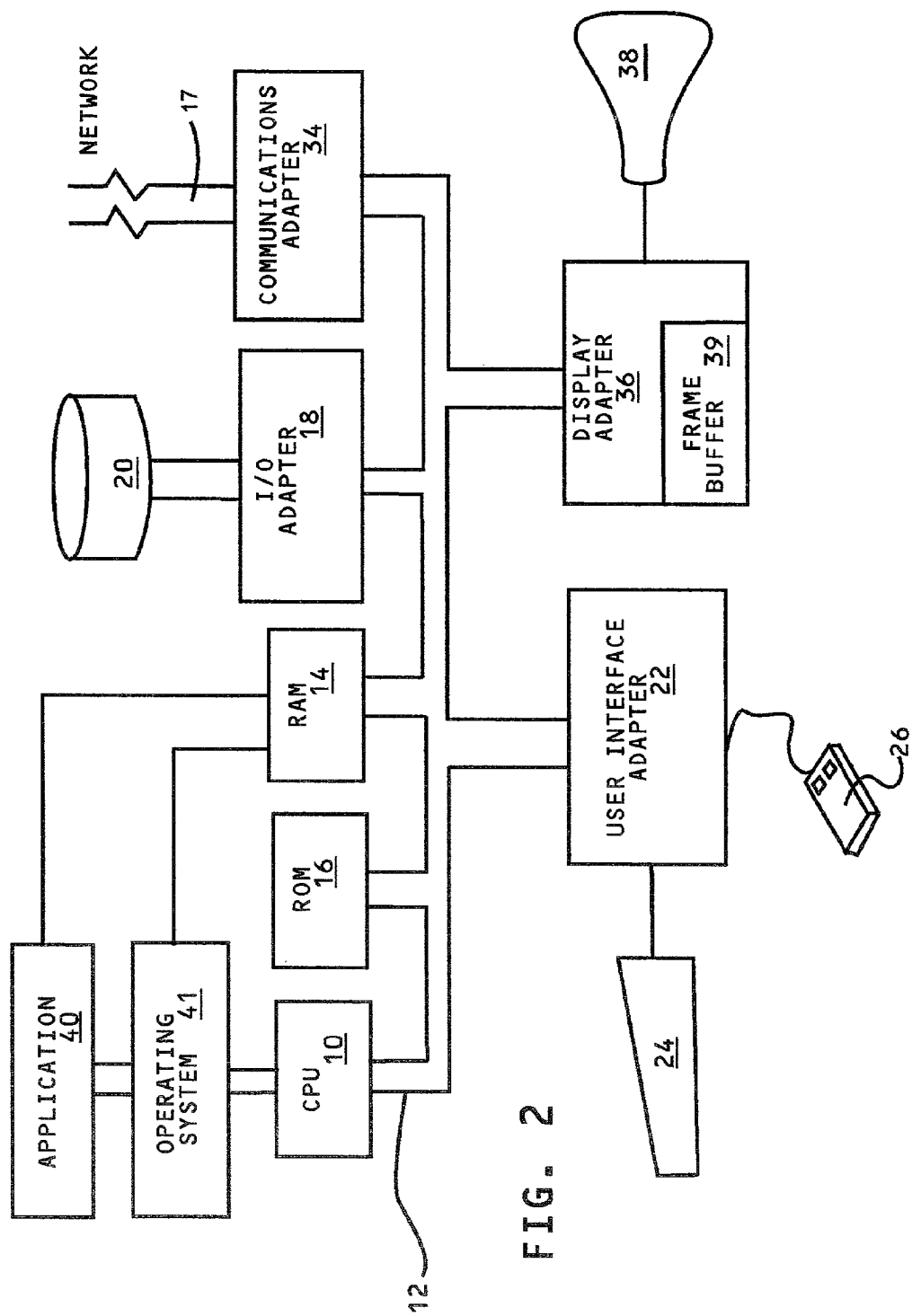
FIG. 2 is a block diagram of a basic generalized data processing system including a central processing unit (CPU) that may be used at a variety of levels of computer power and complexity to provide all of the servers, remote controller computers and even the target client computers shown in the network of FIG. 1.

Referring to FIG. 2, a typical data processing system is shown that may be used in conjunction with object oriented software, such as C++, in implementing the present invention by providing any of the servers, remote controller computers or client computers used to implement the network of the present invention shown in FIG. 1.

A CPU 10, such as any microprocessor in servers or workstations and PCs available from International Business Machines Corporation (IBM) or Dell Corp., is provided and interconnected to various other components by system bus 12. An operating system 41 runs on CPU 10, provides control and is used to coordinate the function of the various components of FIG. 1. Operating system 41 may be one of the commercially available operating systems such as Microsoft's Windows98™ or WindowsNT™, as well as the UNIX or AIX operating systems. Application programs that include routines of the present invention to be subsequently described in detail, runs in conjunction with operating system 41 and provides output calls to the operating system 41, which in turn implements the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 interfaces with the disk storage device 20, i.e. a hard drive. Communications adapter 34 interconnects bus 12 with a network linkage 17 enabling the data processing system to communicate with other such systems over the network. I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. There may be a display associated with the computer or server. In such a set up, display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the mouse or related devices, a user is capable of inputting information to the system through the keyboard 24 or mouse 26 and receiving output information from the system via display 38.

Figure 3:
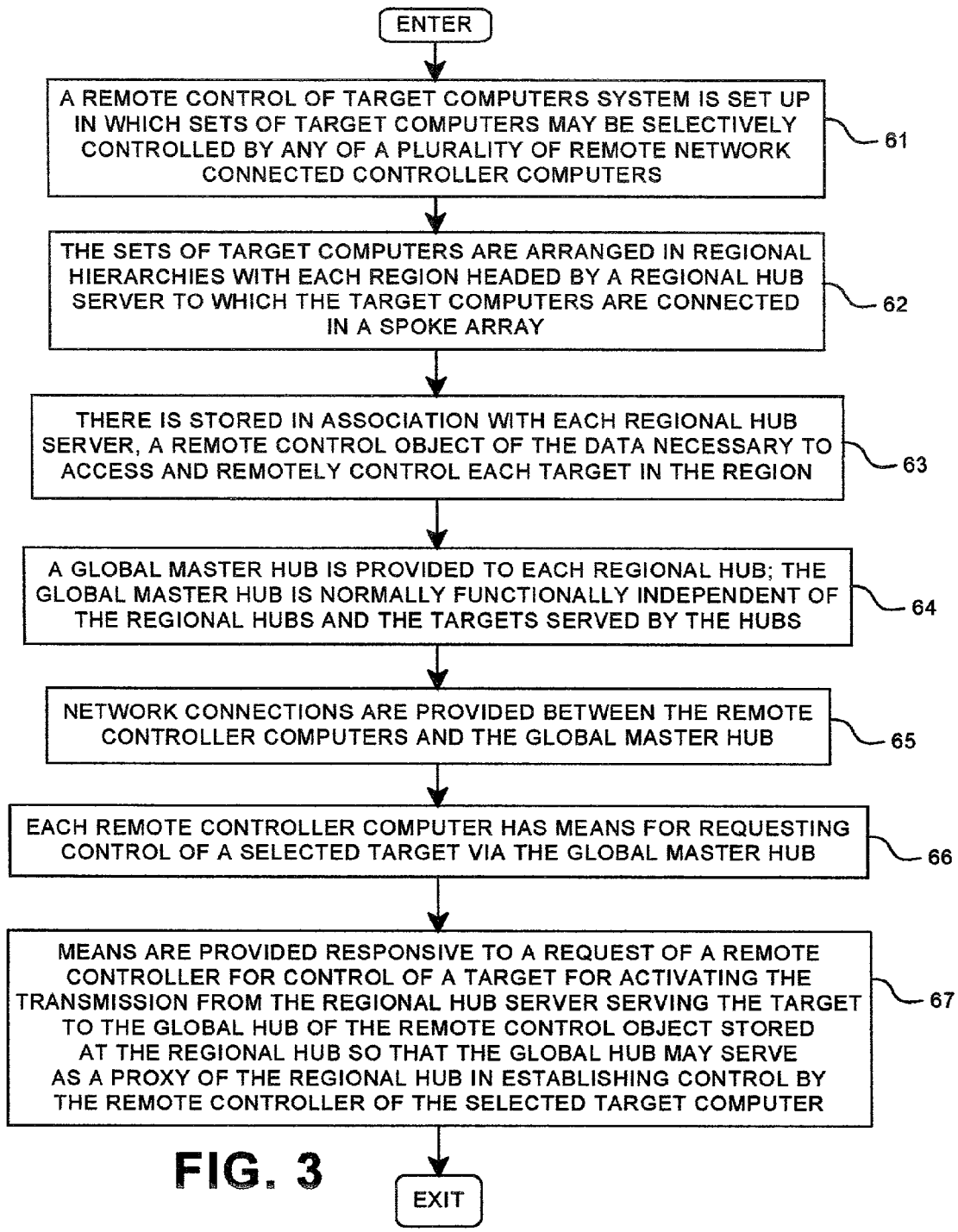
FIG. 3 is an illustrative flowchart describing the setting up of the elements of a program according to the present invention for the global remote control of target computers within a regional hub area.

Now, with reference to the programming shown in FIG. 3, there will be described how the system and programs of the present invention are set up. The invention involves an implementation for giving a selected remote controller the remote control of a selected target client computer, step 61, within a network region served by a regional server hub to which the target computers are connected through a regional hierarchy including an array of spokes connected to the regional hub, step 62. There is stored in association with each regional hub, a remote control object that contains all of the data necessary to set up the access and the remote control of each potential target computer by a remote controller computer, step 63. This remote control object may vary in data content from a specific system to a specific system dependent on the protocols of the system. Some examples of this data content would be: identification of all hub and spoke interconnects within the region, name labels, mapping between hub and spokes and the means for identifying the hub as an end point. Although data content of the remote control object may vary, it must be the data that would have been necessary to establish a remote control session in the conventional existing procedures where the remote controllers directly contact the regional hub servers. The global master hub is provided, which is normally functionally independent of, but still connected to, the regional hubs, step 64. Network connections are provided between the remote controller computers and the global master hub, step 65. Each remote controller is provided with means for requesting control of a selected target via the global master hub, step 66.

With this set up, means are provided responsive to a request of a remote controller for control of a target client computer to activate the transmission from the regional hub serving the target client to the global hub of the remote control object stored at the regional hub, so that the global hub may interface this remote control object with its framework that provides a common object oriented interface with the remote control object. As a result, the global hub may serve as the proxy for any of the regional hubs to which it is connected for the purpose of establishing control by the requesting remote controller of the target client computer via this proxy, step 67. The transmission and interfacing of the remote control object is implemented by using Object Request Broker Protocols, such as CORBA, that involves objects communicating with each other through an object request broker (ORB) that does not need to know the structure of the program from which the object came. CORBA is described in detail in the above-referenced text, *Objects, Components and Frameworks with UML*, pp. 403-414.

Figure 4:
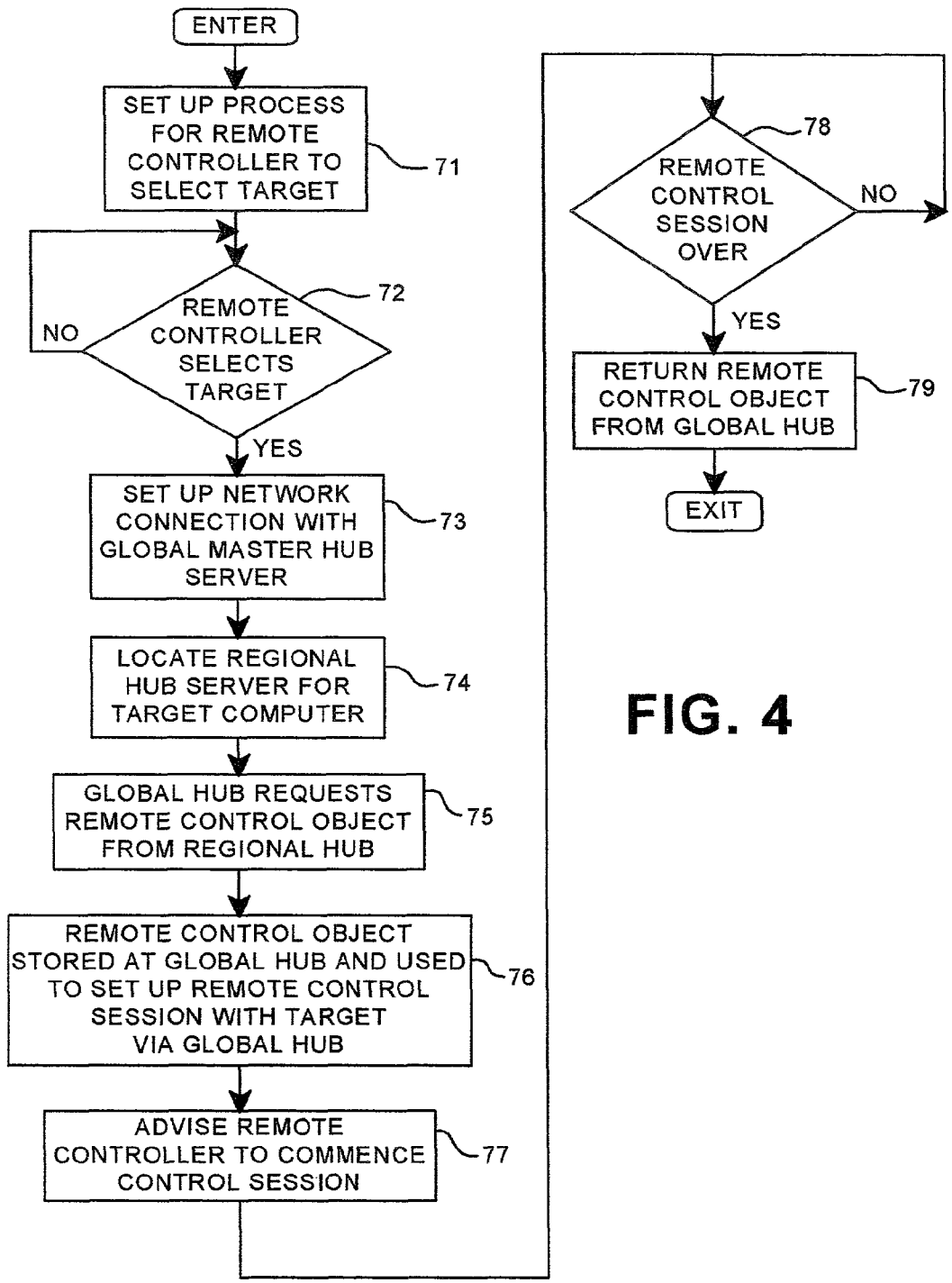
FIG. 4 is a flowchart of an illustrative run of the program set up in FIG. 3.

Now, with reference to the flowchart of FIG. 4, a simplified illustrative run of the process set up in FIG. 3 will be described. A procedure is set up for a remote controller to request control of any target client computer, step 71. A determination is made as to whether the remote controller computer has selected a target client computer, step 72. If No, the process is returned to step 72 and such a selection is awaited. If Yes, a target has been selected, then a network connection with the global master hub server is set up, step 73, and the regional hub server for the target is also located, step 74. At this point, the global hub requests the remote control object stored at the target computer regional hub, step 75. The remote control object is then transmitted from the regional hub to the global hub where it is incorporated into the object oriented framework of the global hub and is used to set up a remote control session wherein the global hub acts like a proxy for the regional hub, step 76. The remote controller is then advised to commence the remote control session with this proxy regional hub, step 77. At this point, a determination is made, step 73, as to whether the remote control session is over. If No, the process is returned to step 78 and the remote control session is continued. If Yes, the remote control object is returned to the appropriate regional hub, step 79, and the process is exited.

One of the implementations of the present invention is as an application program 40 made up of programming steps or instructions resident in RAM 14, FIG. 1, during computer operations. Until required by the computer system, the program instructions may be stored in another readable medium, e.g. in disk drive 20 or in a removable memory such as an optical disk for use in a CD ROM computer input or in a floppy disk for use in a floppy disk drive computer input. Further, the program instructions may be stored in the memory of another computer prior to use in the system of the present invention and transmitted over a network.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In an enterprise computer network comprising a hierarchy of client computers interconnected through a plurality of server computers at a plurality of hierarchical levels, a system for giving a selected controller computer remote control of a selected target client computer in the network comprising:
    a plurality of server controlled regional hubs, each hub connected to and serving a network region including a set of target client computers;
    means for storing at each server controlled regional hub, a remote control object including data necessary to access and remotely control each of the target client computers served by said hub;
    a global master hub connected to said plurality of said regional hubs, said global master hub being normally functionally independent of the regional hubs and the sets of target computers served by said hubs;
    at least one remote controller computer connected to said global master hub;
    means in said remote controller for requesting control of a selected target computer via said global master hub; and
    means responsive to said requesting means to transmit said remote control object of the regional hub serving the selected target computer to said global hub whereby said global hub acts like a proxy of said regional hub in establishing control by said remote controller of said selected target computer.

2. The network remote control system of claim 1 further including an object oriented program framework between said global master hub and said regional hubs providing a common interface enabling the exchange of objects between global master and regional hubs.

3. The network remote control system of claim 2 wherein said object oriented program framework uses object request broker protocols.

4. The network remote control system of claim 3 wherein said object request broker protocols have a Common Object Request Broker Architecture (CORBA).

5. The network remote control system of claims 2 wherein said remote controller computer performs diagnostics on said selected target computer.

6. The network remote control system of claim 3 wherein said remote controller computer is at a help desktop in said enterprise computer network.

7. The network remote control system of claim 2 further including means for transmitting, from said remote controller computer via said global master hub to said selected target computer, data objects for correcting error conditions diagnosed on said target computer.

8. The network remote control system of claim 2 further including:
    a relational database at each server controlled regional hub for storing additional data relating to the target computers served by said hub;
    a global relational database connected to said global master hub; and
    means also responsive to said requesting means to transmit said additional data in the relational database at the regional hub serving the selected target computer to said global relational database to thereby further support said global hub in acting like a proxy of said regional hub in establishing control by said remote controller of said selected target computer.

9. In an enterprise computer network comprising a hierarchy of client computers interconnected through a plurality of server computers at a plurality of hierarchical levels, a method for giving a selected controller computer remote control of a selected target client computer in the network comprising:
 connecting each of a plurality of server controlled regional hubs to a corresponding plurality of network regions, each region including a set of target client computers respectively served by one of said regional hubs;
 storing at each regional hub, a remote control object including data necessary to access and remotely control each of the target client computer served by said hub;
 connecting a global master hub to said plurality of said regional hubs, said global mater hub being normally functionally independent of the regional hubs and the sets of target computers served by said hubs;
 connecting at least one remote controller computer to said global master hub;
 requesting control by said remote controller of a selected target computer via said global master hub; and
 transmitting, in response to said requesting, said remote control object of the regional hub serving the selected target computer to said global hub whereby said global hub acts like a proxy of said regional hub in establishing control by said remote controller of said selected target computer.

10. The network remote control method of claim 9 further including the step of providing an object oriented program framework between said global master hub and said regional hubs to thereby provide a common interface enabling the exchange of objects between global master and regional hubs.

11. The network remote control method of claim 10 wherein said object oriented program framework uses object request broker protocols.

12. The network remote control method of claim 11 wherein said object request broker protocols have a Common Object Request Broker Architecture (CORBA).

13. The network remote control method of claim 10 wherein said remote controller computer performs diagnostic procedures on said selected target computer.

14. The network remote control method of claim 11 wherein said remote controller computer is at a help desktop in said enterprise computer network.

15. The network remote control method of claim 10 further including the step of transmitting, from said remote controller computer via said global master hub to said selected target computer, data objects for correcting error conditions on said target computer.

16. The network remote control method of claim 10 further including the steps of:
 storing in a relational database at each server controlled regional hub, additional data relating to the target computers served by said hub; and
 transmitting, also responsive to said requesting, said additional data in the relational database at the regional hub serving the selected target computer to said global relational database to thereby further support said global hub in acting like a proxy of said regional hub in establishing control by said remoter controller of said selected target computer.

17. A computer readable storage device having a computer readable program stored thereon, the computer readable program comprising program instructions which, when executed by one or more processors, perform a method for giving a selected controller computer remote control of a selected target client computer in an enterprise computer network comprising a hierarchy of client computers interconnected through a plurality of server computers at a plurality of hierarchical levels, said method comprising:
 connecting each of a plurality of server controlled regional hubs to a corresponding plurality of network regions, each region including a set of target client computers respectively served by one of said regional hubs;
 storing at each regional hub, a remote control object including data necessary to access and remotely control each of the target client computers served by said hub;
 connecting a global master hub to said plurality of said regional hubs, said global master hub being normally functionally independent of the regional hubs and the sets of target computers served by said hubs;
 connecting a global master hub to said plurality of said regional hubs, said global master hub being normally functionally independent of the regional hubs and the sets of target computers served by said hubs;
 connecting at least one remote controller computer to said global master hub;
 requesting control by said remote controller of a selected target computer via said global master hub; and
 transmitting, in response to said requesting, said remote control object of the regional hub serving the selected target computer to said global hub whereby said global hub acts like a proxy of said regional hub in establishing control by said remote controller of said selected target computer.

18. The computer readable storage device of claim 17 wherein said method further comprises providing an object oriented program framework between said global master hub and said regional hubs to further provide a common interface enabling the exchange of objects between global master and regional hubs.

19. The computer readable storage device of claim 18 wherein said object oriented program framework uses object request broker protocols.

20. The computer readable storage device of claim 19 wherein said object request broker protocols have a Common Object Request Broker Architecture (CORBA).

21. The computer readable storage device of claim 18 wherein said method further comprises computer program causes said remoter controller computer performing diagnostic procedures on said selected target computer.

22. The computer readable storage device of claim 19 wherein said remote controller computer is at a help desktop in said enterprise computer network.

23. The computer readable storage device of claim 18 wherein said method further comprises transmitting, from said remote controller computer via said global master hub to said selected target computer, data objects for correcting error conditions diagnosed on said target computer.

24. The computer readable storage device of claim 18 wherein said method further comprises:
 storing in a relational database at each server controlled regional hub, additional data relating to the target computers served by said hub; and
 transmitting, also responsive to said requesting, said additional data in the relational database at the regional hub serving the selected target computer to said global relational database to thereby further support said global hub in acting like a proxy of said regional hub in establishing control by said remote controller of said selected target computer.

* * * * *